United States Patent
Shimada et al.

(10) Patent No.: US 11,453,329 B2
(45) Date of Patent: Sep. 27, 2022

(54) VEHICULAR LIGHT SWITCH AND VEHICULAR LIGHT SYSTEM

(71) Applicant: HONDA MOTOR CO., LTD., Tokyo (JP)

(72) Inventors: Manabu Shimada, Wako (JP); Ryuichi Nakano, Wako (JP); Takeo Mizukoshi, Wako (JP); Masahiko Shimada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/045,578

(22) PCT Filed: Apr. 3, 2019

(86) PCT No.: PCT/JP2019/014733
§ 371 (c)(1),
(2) Date: Oct. 6, 2020

(87) PCT Pub. No.: WO2019/194212
PCT Pub. Date: Oct. 10, 2019

(65) Prior Publication Data
US 2021/0023980 A1   Jan. 28, 2021

(30) Foreign Application Priority Data

Apr. 6, 2018 (JP) .............................. JP2018-073643
Mar. 28, 2019 (JP) .............................. JP2019-064507

(51) Int. Cl.
*B60Q 1/14* (2006.01)
*B60Q 1/00* (2006.01)
*B60Q 9/00* (2006.01)

(52) U.S. Cl.
CPC ......... *B60Q 1/1476* (2013.01); *B60Q 1/0076* (2013.01); *B60Q 1/1423* (2013.01); *B60Q 2300/112* (2013.01)

(58) Field of Classification Search
CPC ...... B60Q 11/005; B60Q 1/0023; B60Q 1/26; B60Q 1/04; B60Q 11/00; B60Q 1/34;
(Continued)

(56) References Cited

U.S. PATENT DOCUMENTS

| | | | | |
|---|---|---|---|---|
| 6,518,524 B1 * | 2/2003 | Brandt | ................. | B60Q 1/1476 200/61.54 |
| 2003/0098223 A1 * | 5/2003 | Uchiyama | ............ | B60Q 1/1476 200/61.54 |

(Continued)

FOREIGN PATENT DOCUMENTS

| JP | S5925708 Y2 | 7/1984 |
|---|---|---|
| JP | S60-1048 A | 1/1985 |

(Continued)

OTHER PUBLICATIONS

International Search Report by ISA/JP dated Jun. 25, 2019, on PCT/JP2019/014733, 1 page.

(Continued)

*Primary Examiner* — Wei (Victor) Y Chan
(74) *Attorney, Agent, or Firm* — Rankin, Hill & Clark LLP

(57) ABSTRACT

A vehicular light switch can change the mode of an exterior-illuminating light by rotating to different positions including an auto setting and a SMALL setting. If the position of the vehicular light switch is rotated to the SMALL setting, a momentary mechanism returns the position to the auto setting. If extravehicular brightness is less than a prescribed value and the position is rotated to the SMALL setting whilst the vehicle is stationary, a first light controller turns off a (Continued)

low-beam light, and turns on the low-beam light if the vehicle runs afterwards. If extravehicular brightness is less than a prescribed value and the position is rotated to the SMALL setting while the vehicle is running, a second light controller keeps the low-beam light turned on.

12 Claims, 5 Drawing Sheets

(58) Field of Classification Search
CPC .......... B60Q 1/44; B60Q 1/085; B60Q 1/143; B60Q 1/305; B60Q 2300/314; B60Q 9/00; B60Q 1/1423; B60Q 1/50; B60Q 3/80; B60Q 1/00; B60Q 1/12; B60Q 1/14; B60Q 2300/112; B60Q 2400/20; B60Q 1/0076
See application file for complete search history.

(56) References Cited

U.S. PATENT DOCUMENTS

| | | | |
|---|---|---|---|
| 2008/0100139 A1* | 5/2008 | Michiyama | B60R 1/12 307/10.8 |
| 2009/0204298 A1* | 8/2009 | Yamazaki | B60Q 1/12 701/49 |
| 2015/0035435 A1 | 2/2015 | Alberti et al. | |
| 2015/0246634 A1* | 9/2015 | Hall | H05B 47/115 315/79 |
| 2015/0291082 A1* | 10/2015 | Kasaba | B60Q 1/115 701/49 |

FOREIGN PATENT DOCUMENTS

| | | |
|---|---|---|
| JP | H09-142199 A | 6/1997 |
| JP | 2000-016162 A | 1/2000 |
| JP | 2002-002370 A | 1/2002 |
| JP | 2005-170217 A | 6/2005 |
| JP | 2005-238940 A | 9/2005 |
| JP | 2008-056056 A | 3/2008 |
| JP | 2010-105614 A | 5/2010 |
| JP | 2014-053087 A | 3/2014 |
| JP | 2014-162449 A | 9/2014 |

OTHER PUBLICATIONS

Written Opinion by ISA/JP dated Jun. 25, 2019, on PCT/JP2019/014733, 3 pages.
2011 Chevrolet Camaro Owner Manual, 2010 General Motors LLC. Part No. 22758699 B Second Printing, 14 pages.

* cited by examiner

VEHICULAR LIGHT SWITCH AND VEHICULAR LIGHT SYSTEM

TECHNICAL FIELD

The present invention relates to a vehicular light switch and a vehicular light system.

BACKGROUND ART

JP2005-170217 disclosed a lighting switch having an automatic lighting function of automatically turning on or off a lighting device of a vehicle in accordance with an illuminance outside the vehicle.

Among vehicles on the market, there are vehicles having a combination switch as a lighting switch having the following configuration. The lighting switch can be switched among positions of OFF, AUTO (automatic), SMALL (small), and HEAD LIGHT (head light). In this lighting switch, when the lighting switch is switched to "AUTO", the switch turns on or off a low beam and position lights (so-called small lamps) in accordance with an illuminance outside the vehicle. Further, in such a vehicle, when the lighting switch is turned OFF (turns off the low beam and the position lights), the following operation is performed. The lighting switch automatically returns to a position of AUTO from a position of OFF by a momentary mechanism. In other words, this is a specification which cannot allow the vehicle to run while the lighting switch is set to the position of OFF.

Further, when the lighting switch is switched to the "SMALL", the low beam is turned off and the position light is tuned on. When the lighting switch is switched to "HEAD LIGHT", the low beam is turned on, and the position light is also turned on.

PRIOR ART

Patent Document

PATENT DOCUMENT 1: JP2005-170217

SUMMARY OF INVENTION

Problem to be Solved by Invention

In a case of a vehicle equipped with a position of "AUTO" in the lighting switch, it is true as follows:

When the circumference of the vehicle is dark, the mode of "AUTO", turning on the low beam, can illuminate a road brighter than the mode of "SMALL", turning off the low beam.

In a case of the vehicle previously described in the column in Background Art, even if it is tried to turn the lighting switch to a position of "OFF", it has such a specification that the lighting switch is compulsory moved to a position of "AUTO". This is effective to prevent the driver from forgetting turning on the light when it is necessary to turn on the light.

However, the vehicle can be driven while the lighting switch is positioned at "SMALL". Accordingly, it is possible to drive the vehicle in such a state that the low beam is turned off at night, in a tunnel, etc. Accordingly, there is room for improvement.

The problem in the present invention is to provide a vehicular light switch and a vehicular light system, capable of surely turning on the low beam even at night and in a tunnel, etc.

Means for Solving Problem

An aspect of the present invention provides a vehicular light switch comprising:

a combination switch capable of switching a mode of a light for illuminating an outside by changing a position by rotation, wherein the positions include an automatic position and a SMALL position, wherein the automatic position is the position for turning on or off the light in accordance with a brightness outside a vehicle and the SMALL position is a position for turning on a position light, and a mechanism configured to return the position to the automatic position when the position is rotated to the SMALL position.

Advantageous Effect of Invention

According to the present invention, it is possible to provide a vehicular light switch and a vehicular light system capable of running a vehicle while surely turning on a low beam even at night and in a tunnel, etc.

MODES FOR CARRYING OUT INVENTION

Hereinafter, an embodiment of the present invention is explained below.

Figure 1:
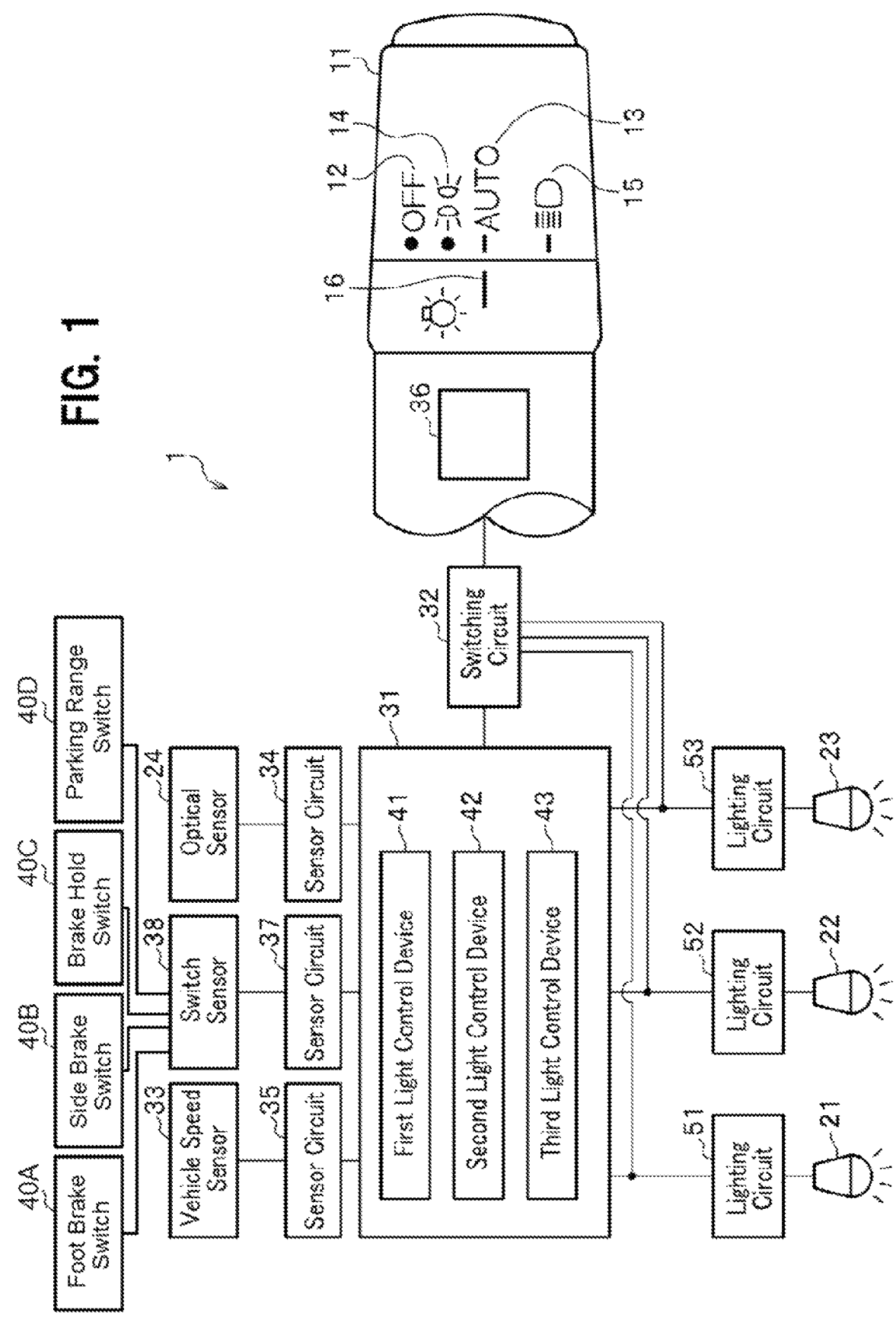
FIG. 1 is a block diagram showing a configuration of a vehicular light system according to an embodiment of the present invention.

FIG. 1 is a block diagram showing a configuration of a vehicular light system according to the embodiment of the present invention. The vehicular light system 1 is installed on a vehicle to be used. The vehicular light system 1 has a vehicular light switch 11 installed at a predetermined position of a driver's sheet. The vehicular light switch 11 is a combination switch capable of switching, by rotation, a mode for illuminating an outside from the vehicle among a plurality of positions. Accordingly, the vehicular light switch 11 has a circular tube shape. The vehicular light switch 11 can switch a mode of the light among a plurality of steps, in this example, four steps by manually rotating the vehicular light switch 11 in a circumferential direction thereof.

The vehicular light system 1 has four kinds of positions, i.e., an OFF position 12, an AUTO (automatic) position 13, a SMALL (small) position 14, and a HEAD LIGHT (head light) position 15. On a circumferential surface of the vehicular light switch 11, characters or icons indicative of the four kinds of positions, i.e., the OFF position 12, the AUTO position 13, the SMALL position 14, and the HEAD LIGHT position 15 are indicated. These characters and icons are arranged on the circumferential surface in a circumferential direction of the vehicular light switch 11. More specifically, the HEAD LIGHT position 15. the AUTO position 13, the SMALL position 14, and the OFF position 12 are indicated in order from a near side of a driver. When a predetermined position is set at a reference position 16 by manually rotating the vehicular light switch 11 in the circumferential direction, one of the modes at the position set at the reference position 16 functions. For example, as shown in FIG. 1, when the AUTO position 13 is set at the reference position 16, the mode of "AUTO" functions. When the SMALL position 14 is set at the reference position 16, the mode of "SMALL" functions. When the OFF position 16 is set at the reference position 16, the mode of "OFF" functions. When the HEAD LIGHT position 15 is set at the reference position 16, the mode of "HEAD LIGHT" functions.

Hereinafter contents of the modes at respective positions are described below. First, a vehicle has a head light disposed on a front of the vehicle for illuminating a location in front of the vehicle. The head light includes a low beam 21 and a high beam 23. The high beam 23 has an illumination distance longer than an illumination distance of the low beam 21. Further, the vehicle has position lights 22 disposed on a front face of the vehicle and a rear face of the vehicle for illuminating a circumference of the vehicle. The position light 22 has an illumination distance shorter than the illumination distance of the low beam 21. First, the mode of "OFF" is a mode of turning off the low beam 21 and the position light 22 installed in the vehicle.

In the description of the present invention, explanation about turning on and off of the low beam 21 is made. It is general that the vehicle has the high beam 23 also. Switching between the low beam 21 and the high beam 23 is done by switching with an unshown switch which is separated from the vehicular light switch 11. When the unshown switch is set to select the high beam 23, in the description of the present invention, this means turning on or off of the high beam 23.

Recently, there are vehicles capable of automatically switching between the low beam 21 and the high beam 23 in accordance with automatic determination from a state of a region in front of the vehicle (whether there is an oncoming vehicle) by a control device. In such a vehicle, in this description of the present application, if there may be a description of turning on or off of the low beam 21, but this means turning on and off of the low beam 21 or the high beam 21 automatically selected by the control device.

Continuously, the modes are described below.

In the mode of "AUTO", control of the lights are made in accordance with a detection result of an optical sensor 24 for detecting a brightness outside the vehicle. More specifically, when the brightness outside the vehicle detected by the optical sensor 24 is less than a first predetermined value, the low beam 21 and the position light 22 are turned on. The brightness lower than the first predetermined value is a brightness when the outside of the vehicle becomes so dark that it is necessary to turn on the head light, etc. This is, for example, a case of at evening, at night, a heavy rain, cloudy, in a state of the vehicle in a tunnel or the like. Further, when the brightness outside the vehicle detected by the optical sensor 24 in this mode is higher than a second predetermined value, the low beam 21 and the position light 22 are turned off. The brightness higher than the second predetermined value is when the outside of the vehicle is so bright that it is not necessary to turn on the head light, etc. In addition, the first predetermined value and the second predetermined value may be the same value or different values.

In the mode of "SMALL", the low beam is turned off, but the position light 22 is turned on.

In the mode of "HEAD LIGHT", the low beam 21 is turned on, and the position light 22 is also turned on.

In the vehicular light switch 11 for switching among these respective modes, respective positions for setting respective modes are arranged as follows:

On a circumferential surface of the vehicular light switch 11, the AUTO position 13 is indicated. The "SMALL" position 14 is arranged on the circumferential surface of the vehicular light switch 11 on a one side of the "AUTO" position 13, i.e., a side opposite to a side of the driver in this example. Further, the OFF position 12 is arranged at a position remoter from the driver than the "SMALL" position 14. Further, the HEAD LIGHT position 15 is arranged on the other side in the circumferential direction of the "AUTO" position 13, in this example, on the side of the driver. In addition, when the vehicular light switch 11 is switched among these respective positions, the vehicular light switch 11 provides the driver with a feeling of a click by a well-known means.

The vehicular light switch 11 includes a momentary mechanism 36 (mechanism). The momentary mechanism 36 including a torsion spring, etc. is known. The momentary mechanism 36 returns the vehicular light switch 11 to the AUTO position 13 by a spring force, etc. from the torsion spring when the driver switches the vehicular light switch 11 to the OFF position 12 and the SMALL position 14. However, though the driver switches the vehicular light switch 11 to the HEAD LIGHT position 15, the momentary mechanism 36 do not operate, but the vehicular light switch 11 still remains at the HEAD LIGHT position 15.

The vehicular light switch 11 includes a switching circuit 32 for effecting switching in response to switching the position thereof. The vehicular light switch 11 is configured by combining, for example, semiconductor switches or mechanical switches. The switching circuit 32 is connected to a control device 31 for convergently controlling the vehicular light system 1. The control device 31 is a control device configured with a micro-computer as a central component. The control device 31 can detect a current position of the vehicular light switch 11 through the switching circuit 32.

The control device 31 is connected to, in addition to the above-described optical sensor 24, a vehicle speed sensor 33 for detecting a speed of the vehicle through sensor circuits 35 and 34, which are interface circuits, respectively. Further, the control device 31 is connected through a sensor circuit 37 to a switch sensor 38 for detecting on and off information of at least one of switches of a foot brake switch 40A, a side brake switch 40B, a brake hold switch 40C and a parking range switch 40D. Note: it is not always necessary that the optical sensor 24, the vehicle speed sensor 33, and the switch sensor 38 are connected to the control device 31, directly, and these sensors may be communicated through (Controller Area Network).

In addition, the control device 31 is connected through lighting circuits 51 to 53, which are operated as interfaces, to a plurality of lights, including the low beam 21, the position light 22, the high beam 23 (each of which is a plurality of lights differently shown in FIG. 1), respectively.

The switching circuit 32 is connected to lighting circuits 51 to 53. When the position of the vehicular light switch 11 is at the OFF position 12, the switching circuit 32 effects switching to turn off the low beam 21 and position light 22.

When the position of the vehicular light switch 11 is at the SMALL position 14, the switching circuit 32 effects switching to turn off the low beam 21 and turn on the position light 22. When the position of the vehicular light switch 11 is at the HEAD LIGHT position 15, the switching circuit 32 effects switching to turn on the low beam 21 and turn on the position light 22. When the position of the vehicular light switch 11 is at the AUTO position 13, the switching circuit 32 informs the control device 31 that the position of the vehicular light switch 11 is at the AUTO position 13.

The control device 31 executes functions of the first to third light control devices 41 to 43 based on a predetermined control program.

First, a process executed by the third light control device is described below. The third light control device 43 operates when the position of the vehicular light switch 11 is at the AUTO position 13. More specifically, the third light control device 43 executes the mode of "AUTO". Accordingly, when the brightness outside the vehicle detected by the optical sensor 24 is lower than the first predetermined value, the low beam 21 and the position light 22 are turned on. When the brightness outside the vehicle detected by the optical sensor 24 is equal to or higher than the second predetermined value, the low beam 21 and the position light 22 are turned off.

Figure 2:
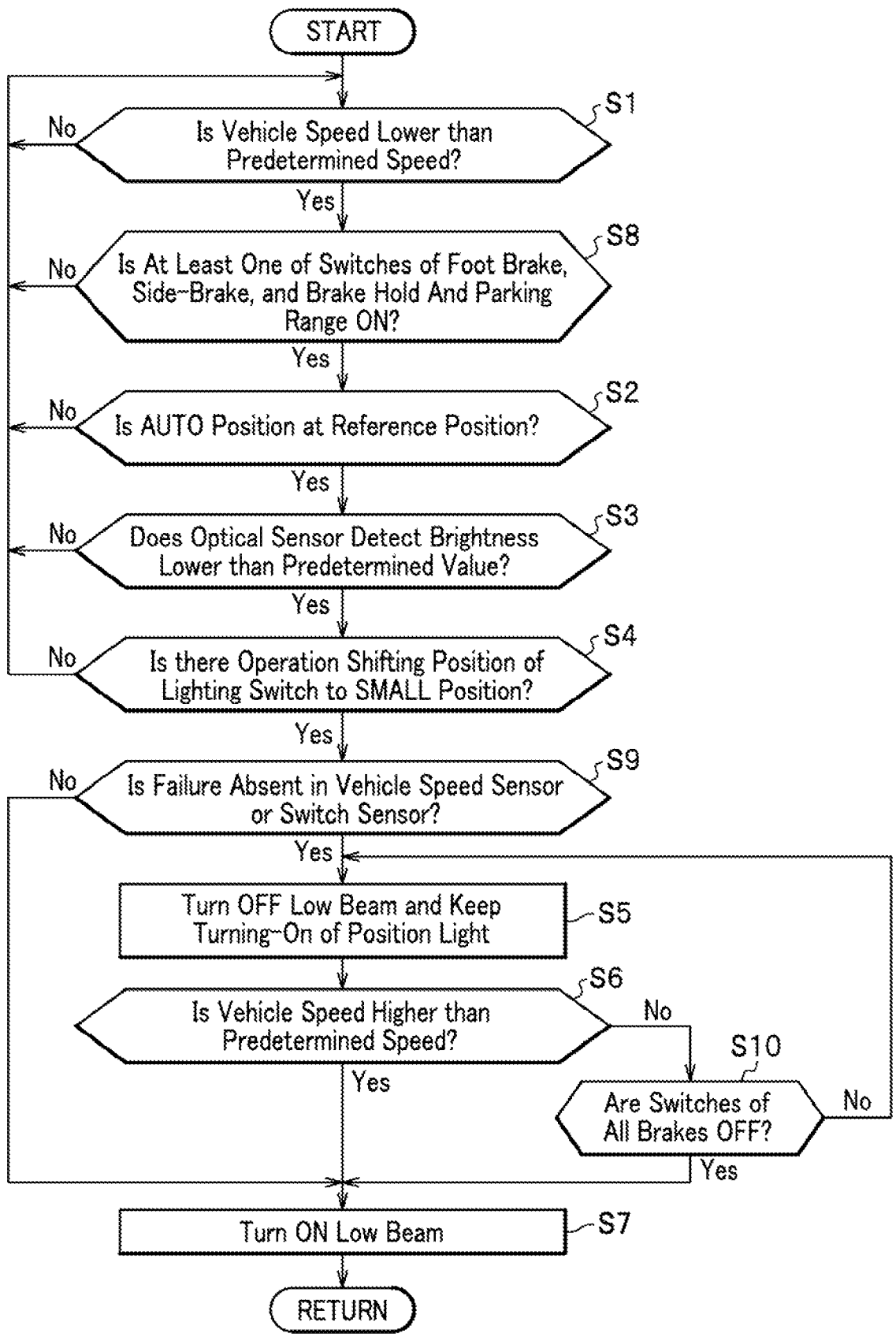
FIG. 2 is a flow chart showing a process executed by a first light control section of the vehicular light system according to the embodiment of the present invention.

Next, the process executed by the first light control device 41 is described below. FIG. 2 is a flow chart for explaining the process executed by the first light control device 41. When the first light control device 41 determines that the vehicle speed detected by the vehicle speed sensor 33 is lower than the predetermined speed (a low speed near stopping) (Yes in S1), processing proceeds to S8. At S8, the first light control device 41 determines via the switch sensor 38 whether at least one of the switches 40A, 40B, 40C, 40D of the foot brake, the side brake, the brake hold, and the parking range is ON or not. When it is determined that at least one of the switches of the foot brake, the side brake, the brake hold and the parking range is ON (Yes at S8), processing proceeds to S2. The first light control device 41 determines at S2 whether or not the AUTO position 13 is set at the reference position 16. When the AUTO position 13 is set at the reference position 16 (Yes at S2), the first light control device 41, processing proceeds to S3. At S3, the first light control device 41 determines whether or not the optical sensor 24 detects a brightness lower than the predetermined value. In the first light control device 41, when the optical sensor 24 detects the brightness lower than the predetermined value (Yes at S3), processing proceeds to S4. At S4, the first light control device 41 determines whether or not there is an operation for shifting the position of the vehicular light switch 11 to the SMALL position 14. When there is the operation to shift the position of the vehicular light switch 11 to the SMALL position 14 (Yes at S4), processing proceeds to S9. At S9, the first light control device 41 determines whether or not there is a failure in the vehicle speed sensor 33 or the switch sensor 38. When there is no failure (Yes at S9), the first light control device 41 executes the following process.

The first light control device 41 turns off the low beam 21 and keeps turning on of the position light 22. Though there is an operation to shift the position of the vehicular light switch 11 to the SMALL position 14 (Yes at S4), when the driver releases the switch 11 from his hand, the vehicular light switch 11 returns to the AUTO position 13 by the momentary mechanism 36. The order of the processes from S1 to S4 executed by the first light control device 41 can be changed occasionally.

Further, when a result at S1, S2, S3, S4, or S8 is "No", the first light control device 41 returns the processing to the determination at S1.

More specifically, in this example, it is the case where the optical sensor 24 detects a brightness lower than the predetermined value and any one of the brakes are on-state when the AUTO position 13 is set at the reference position 16. Accordingly, the low beam 21 is turned on and the position light 22 is also turned on before the process at S4. However, when the position of the vehicular light switch 11 is shifted to the SMALL position 14, the low beam 21 is turned off.

However, after this, it is determined that the vehicle speed detected by the vehicle speed sensor 33 is equal to or higher than the predetermined speed (Yes at S6), the first light control device 41 turns on the low beam 21 again (S7). Further, a result of S6 is "No", processing proceeds to S10. At S10, the first light control device 41 determines whether or not all of the switches of the foot brake, the side brake, the brake hold and parking range are OFF using the switch sensor 38. When the switch sensor 38 determines that all of the switches of the foot brake, the side brake, the brake hold and parking range are OFF (Yes at S10), processing proceeds to S7.

In other words, after the low beam is turned off, the low beam 21 is turned on again (S7) in either of a case where the vehicle speed sensor 33 detects a vehicle speed equal to or higher than the predetermined speed or a case where the switch sensor 38 detects all of the switches 40A, 40B, 40C, 40D of the foot brake, the side brake, the brake hold, and the parking range are OFF the low beam 21 is turned on again (S7).

In addition, it is possible to delete the S8, so that processing proceeds to S2.

Further, the order of S1, S2, S3, S4, and S8 may be appropriately changed. The order of S6 and S10 may be appropriately changed.

Figure 3:
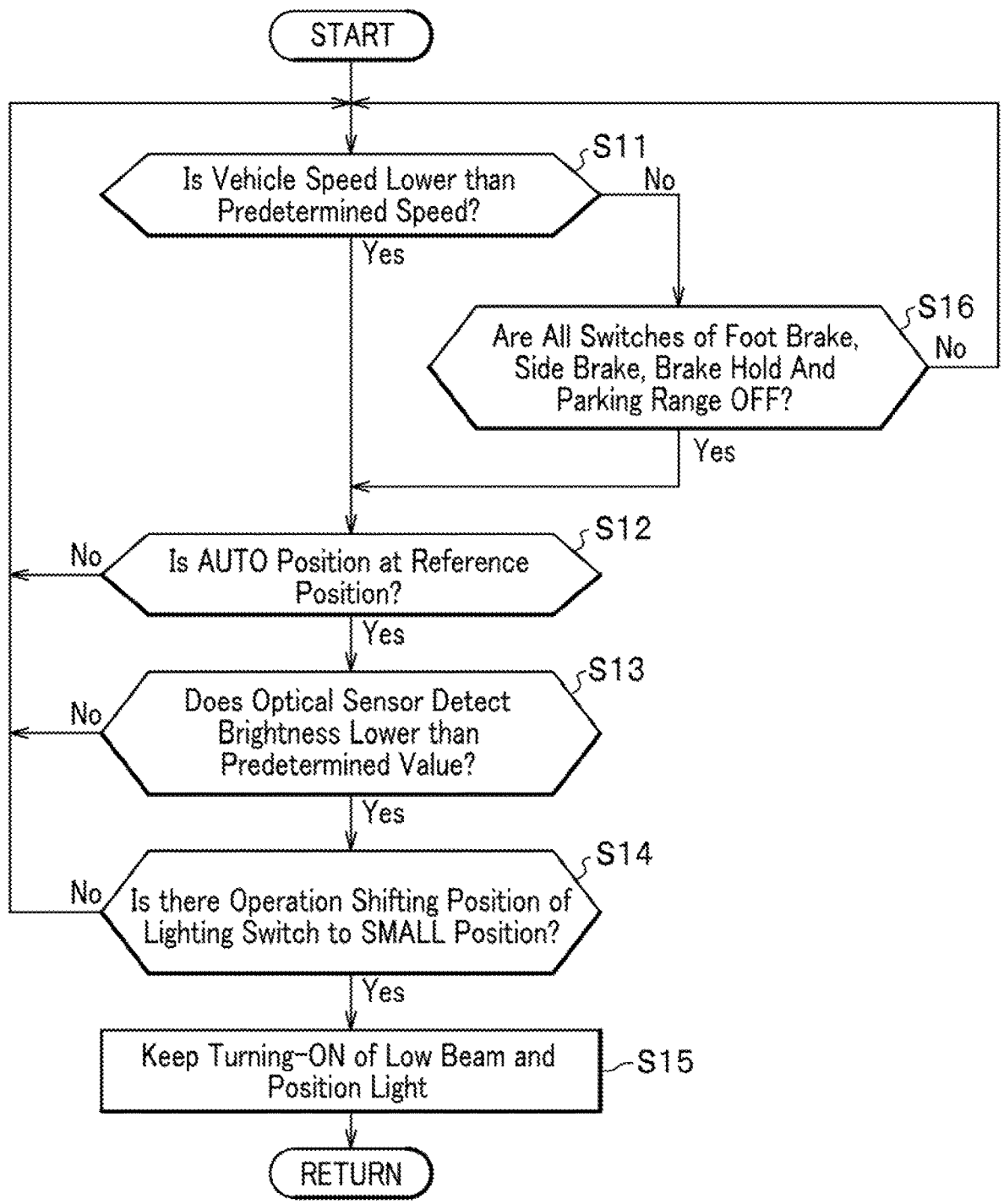
FIG. 3 is a flow chart showing a process executed by a second light control section of the vehicular light system according to the embodiment of the present invention.

Next, a process executed by the second light control device 42 is described below. FIG. 3 is a flow chart explaining the process executed by the second light control device 42. When the second light control device 42 determines that the vehicle speed detected by the vehicle speed sensor 33 is equal to or higher than the predetermined speed (Yes at S11), processing proceeds to S12. The second light control device 42 determines whether or not the AUTO position is set at the reference position 16. In the second light control device 42, processing proceeds to S13, when the AUTO position 13 is set at the reference position 16 (Yes at S12). At S13, the second light control device 42 determines whether not the optical sensor 24 detects a brightness lower than the predetermined value. When the second light control device 42 determines that the optical sensor 24 detects the brightness lower than the predetermined value (Yes at S13), processing proceeds to S14. At S14, the second light control device 42 determines whether or not there is an operation to shift the position of the vehicular light switch 11 to the SMALL position 14. When there is the operation to shift the position of the vehicular light switch 11 to the SMALL position (Yes at S14), the second light control device 42 executes the following process. The second light control device 42 keeps turning on of the low beam 21 and the position light 11 (S15).

When the S11 is No, processing proceeds to S16. At S16, the second light control device 42 determines whether or not all of the switches of the foot brake, the side brake, the brake hold and parking range are OFF. When the switch sensor 38 determines that all of the switches of the foot brake, the side brake, the brake hold and parking range are OFF (Yes at S16), processing proceeds to S12. In other words, processing proceeds to S12 in either case where the vehicle speed sensor 33 detects a vehicle speed higher than the predetermined speed, or a case where the switch sensor 38 detects that all of the switches of the foot brake, the side brake, a brake hold and parking range are OFF.

When a result at S12, S13, S14, or S16 is No, the second light control device 42 returns the processing to determination at S11.

Further, an order of the processes from S12 to S14 executed by the second light control device 42 may be changed. The processes from S12 to S14 can be done before S11. Further, an order of the S11 and S16 can be changed occasionally.

Further, it is also possible that S16 is deleted, so that the processing proceeds to S12.

Further, the operation of turning on and off of each of the light by switching executed by the switching circuit 32 can be executed by the control device 31.

Figure 4:
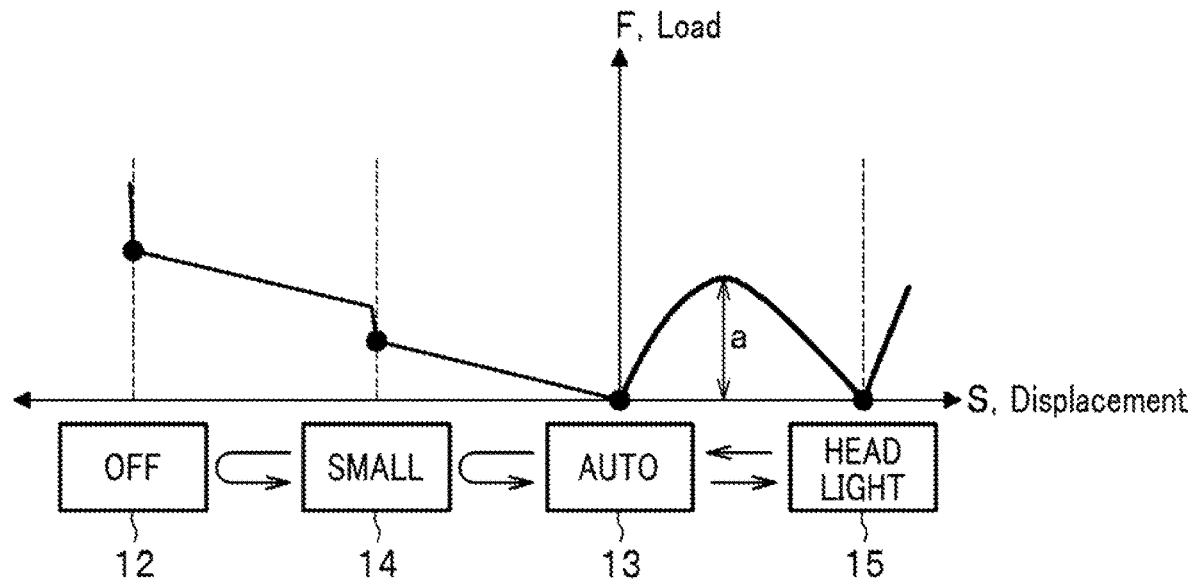
FIG. 4 is a load-displacement chart of the vehicular light switch according to the embodiment of the present invention.

FIG. 4 is a load-displacement chart of the vehicular light switch 11 according to the embodiment of the present invention.

Figure 5:
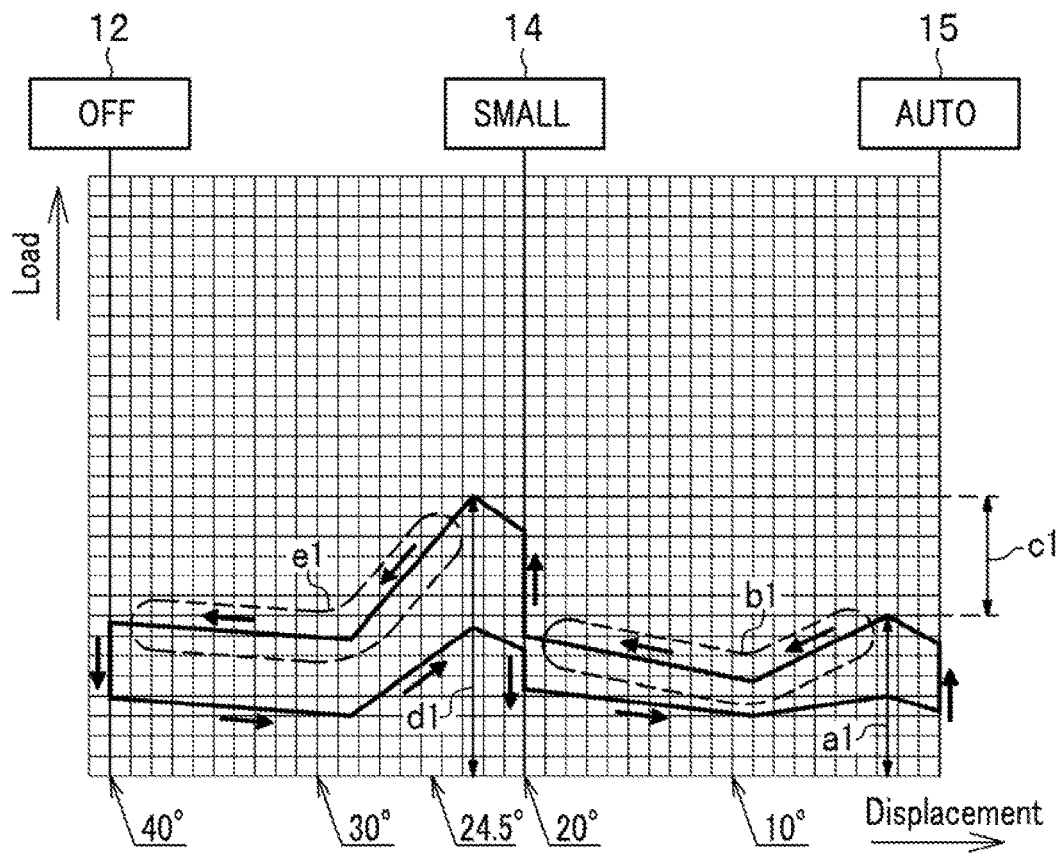
FIG. 5 is a load-displacement chart of the vehicular light switch according to a modification of the embodiment of the present invention.
Figure 6:
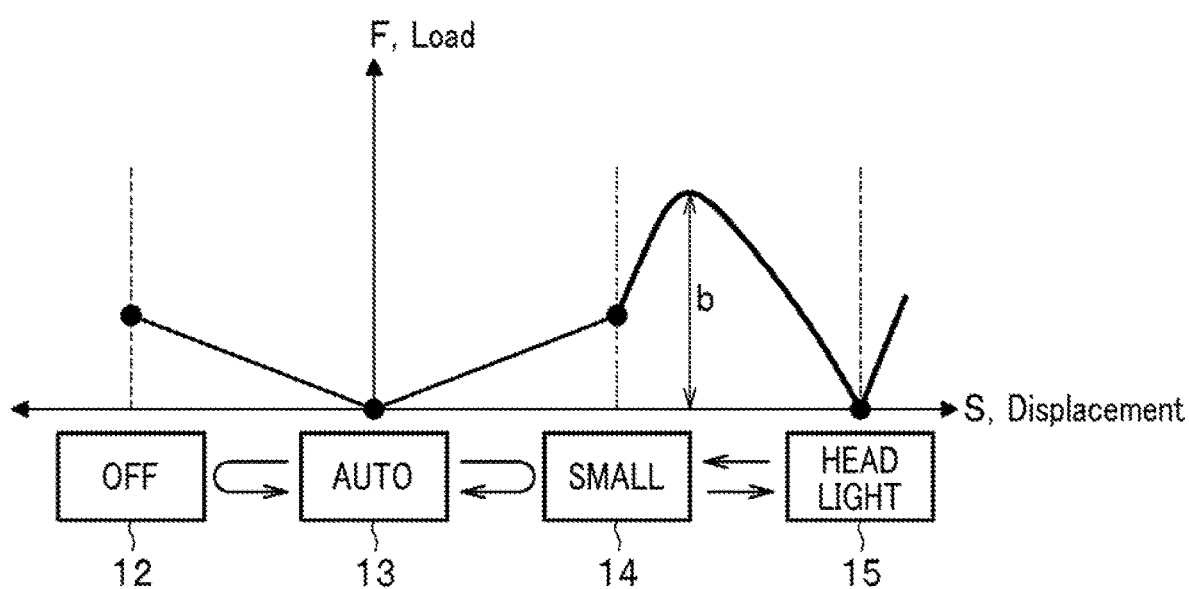
FIG. 6 is a load-displacement chart of the vehicular light switch according to another modification of the embodiment of the present invention.

FIGS. 5 and 6 are load-displacement charts of the vehicular light switch according to modifications of the present invention.

In FIG. 5, a magnitude of load necessary for operation of shifting the vehicular light switch 11 by rotating the vehicular light switch 11 (axis of abscissa) based on the AUTO position 13 as a reference is shown. To generate a feeling of click during the operation, the vehicle switch 11 is set such that an operation load is required to have such a level to switch the position to respective positions based on the AUTO position 13 as a reference. Accordingly, the operation of the vehicle switch 11 requires an operation load higher than a certain level since the operation is made against the load. Further, it is necessary to rotate the vehicular light switch against an energization force by the momentary mechanism 36, so that a certain level of the operation load becomes necessary when switching is made to the OFF position 12 and the SMALL position 14.

In the example shown in FIG. 4, the operation load necessary to operate the vehicular light switch 11 sequentially increases during switching to the SMALL position 14 and further to the OFF position 12 from the AUTO position 13 as a reference. More specifically, to switch the vehicular light switch 11 from the AUTO position 13 to the SMALL position 14 a predetermined operation load is necessary due to the operation load against the energization force by the momentary mechanism 36 and the operation load to generate the click feeling on the vehicular light switch 11. To switch the vehicular light switch 11 to the OFF position 12, a higher operation load is necessary. Further, an operation load having a magnitude, indicated by an arrow a is necessary to generate the click feeling on the vehicular light switch 11 to switch the vehicular light switch 11 to the HEAD LIGHT position 15 from the AUTO position 13 as a reference. The operation load having the magnitude indicated by the arrow a is set to a value which is greater than usual to some extent to prevent the vehicular light switch 1 from easily switching to the HEAD LIGHT position 15. Further, it is not necessary to set the operation load for generating the click feeling from the AUTO position 13 to the SMALL position 14 as large in magnitude as the operation load for the momentary mechanism to the HEAD LIGHT position 15 because there is an assumption that the vehicular light switch 1 should return to the AUTO position 13 by the momentary mechanism 36.

FIG. 5 is a load-displacement chart of the vehicular light switch according to a modification of the present invention. In FIG. 5, a reference numeral a1 indicates an operation load when the position is changed from the AUTO position 13 to the SMALL position 14. The operation load is made small at a reference numeral 131 to generate the click feeling while the vehicular light switch 11 shifts from the AUTO position 13 to the SMALL position 14. In the example in FIG. 4, there is a risk of the operation feeling becoming heavy to completely rotate the vehicular light switch to the SMALL position because a curve of the operation load continuously increases.

A reference numeral c1 indicates an operation load to shift the vehicular light switch 11 from the SMALL position 14 to the OFF position 12 and an operation load to generate a click feeling during shifting of the vehicular light switch 11 from the SMALL position 14 to the OFF position 12.

A reference numeral d1 is an operation load from the AUTO position 13 to the OFF position 12 and is larger than the load indicated by the reference numeral al. This setting provides the operator to have a feeling of stop of the vehicular light switch 11 from the AUTO position 13 to the OFF position 12. More specifically, this prevents the vehicular light switch 11 from rotating to the OFF position 12 by the movement of the vehicular light switch 11 for switching operation from the AUTO position 13 to the SMALL position 14.

The load becomes small at a reference numeral e1. The click feeling during shifting from the SMALL position 14 to the OFF position 12 is generated by making the operation load indicated by the reference numeral e1 than a peak of the operation load according to the reference numeral d1. The load-displacement chart of the vehicular light switch among the OFF position 12, the AUTO position 13, the SMALL position 14 may be configured as shown in FIG. 5.

Another modification of the embodiment is shown in FIG. 6 in which a difference from the example shown in FIG. 4 is in an arrangement of respective positions. More specifically, in the example of FIG. 4, the SMALL position 14, the OFF position 12 is sequentially arranged in a one direction of the circumferential direction of the switch 11 with reference to the AUTO position 13. Further, the HEAD LIGHT 15 is arranged in another direction of the circumferential direction with reference to the AUTO position 13. In contrast to this, in the example shown in FIG. 6, only the OFF position 12 is arranged in the one direction of the circumferential direction of the vehicular light switch 11 with reference to the AUTO position 12. Further, the SMALL position 14, the SMALL position 14 and the HEAD LIGHT are arranged in another direction of the vehicular light switch 11 with reference to the AUTO position 13.

In the example shown in FIG. 6, to rotate the vehicular light switch 11 to the HEAD LIGHT position 15 with reference to the AUTO position 13, the following operation load is necessary. First, to rotate the vehicular light switch 11 to the SMALL position 14, an operation load for generating the click feeling of the vehicular light switch 11 and an operation load against the energization force of the momentary mechanism 36 are necessary. To rotate the vehicular light switch 11 further from the SMALL position 14 to the HEAD LIGHT position 15, an operation load is necessary to generate the click feeling and an operation load having a magnitude to such an extent as to prevent the vehicular light switch from further rotating to the HEAD LIGHT position 15 due to inertia due to the operation from the SMALL position 14 to the HEAD LIGHT position 15. Accordingly, an operation load having the total of the operation loads shown by an arrow b to rotate the vehicular light switch 11 to the HEAD position 15 with reference to the AUTO position 13. The operation loads indicated by the arrow b is higher than the operation load indicated by the arrow a in FIG. 4. Further, the operation load indicated by the arrow b is higher than the operation load necessary for rotating the vehicular light switch 11 from the AUTO position to the OFF position 12, in FIG. 4.

On the other hand, in the example in FIG. 6, there is a difference from FIG. 4 as follows:

The OFF position 12, at which the light is not turned on, and the SMALL LIGHT position and the HEAD LIGHT position 15, on which the lights are turned on, are arranged in an opposite direction of the rotation direction. More specifically, the rotation directions of the vehicular light switch 11 to turn on and off the lights are opposite.

Next, advantageous effects of the present embodiment and modifications will be described below. According to the vehicular light switch 11 of the present embodiment and the modification, though the SMALL position 14 is set at the reference position 16, the vehicular light switch 11 can be returned to the AUTO position by the momentary mechanism 36. More specifically, in such a state that the head light is necessary because it becomes so dark that the head light is necessary outside the vehicle, it is basically impossible to make the low beam 21 in a no light state by the mode of the AUTO. According to the embodiment, it is possible to surely turn on the low beam 21 even at night and in a tunnel, etc.

Further, according to the first light control device 41 described with reference to FIG. 2, when the vehicle stops, though it becomes so dark that the head light is necessary, a lighting control is made as follows:

An operation by the driver to set the SMALL position 14 to the reference position 16 can turn off the low beam 21 and turns on only the position light 22. After this, when the vehicle runs, the low beam 21 is turned on again. According to the present embodiment, in a case where the outside of the vehicle is so dark that the head light is necessary, when the vehicle runs, it is possible to surly turn on the low beam. On the other hand, when the vehicle stops, it is possible to turn off the low beam 21 under determination by the driver. Turning off the low beam 21 and turning on only the position light 22 provide an advantageous effect such that a visibility of the vehicle from the circumference of the vehicle being stopping is kept with preventing the circumference from dazzling. Further, in this case, this operation contributes saving electric energy consumption of the batteries in the vehicle.

Further, a condition of turning on of the low beam 21 (S7) is that at least one of the brakes is turned on (Yes at S8). More specifically, because the determination only by the vehicle speed, etc. (S1) is not used as a condition of turning on the low beam 21, turning off the low beam 21 when the circumference of the vehicle is dark can be more surely performed in a state of the vehicle stops. Accordingly, during running of the vehicle while the circumference is dark, it is possible to run the vehicle with surely turning on the low beam 21.

Further, when each of the brakes turns off (No at S8), the low beam 21 is turned on. In other words, when the driver releases each of the brakes to run the vehicle, the low beam 21 turns on. According to this operation, during running of the vehicle, it is possible to surely turn on the low beam 21. Further, since the low beam 21 turns on when the vehicle speed is equal to or higher than the predetermined speed (Yes at S6), or each of the brakes turns off (No at S8), it is possible to surely turn on the low beam 21 during running of the vehicle.

In addition, when a failure is detected in the vehicle speed sensor 33 or the switch sensor 38 (S9), the low beam 21 is turned on, so that it is possible to surely turn on the low beam 21 even though the vehicle speed is unknown or it is unknown whether or not the brake is turned on or off.

Further, according to the second light control device 42 described with reference to FIG. 3, when the outside of the vehicle running is so dark that the head light is necessary, a lighting control for the lights is performed as follows:

The low beam 21 cannot be turned off by the operation by the driver setting the SMALL position 14 at the reference position 16. According to the vehicular light system 1 as described above, if the SMALL position 14 is set at the reference position 16, the switch returns to the AUTO position by the momentary mechanism 36. However, it is not impossible to keep the vehicular light switch 11 in a state that the SMALL position 14 is set at the reference position 16 by a pressure by the hand of the driver on the vehicular light switch 11. Even in this case, according to the second light control device 42, turning on the low beam 21 is kept when the outside of the vehicle running is so dark outside the vehicle running. Accordingly, when it is so dark that the head light is necessary outside the vehicle, it is possible to surely turn on the low beam 21 during running of the vehicle, so that the running vehicle can have sufficient illumination.

Further, the low beam 21 and the position light 22 are turned on, when each of the brakes is turned off (No at S16) as a condition. More specifically, when the driver releases all brakes to run the vehicle, the low beam 21, etc. is turned on. This provides surely turning on of the low beam 21 when the vehicle runs.

Further, because the low beam 21 can be surely turned on when a failure is detected in the vehicle speed sensor 33 or the switch sensor 38 (S17), the low beam 21 can be surely turned on even when the vehicle speed is unknown or whether the brake is turned on or off is unknown.

Further, according to the vehicular light switch 11 of the present embodiment, though the OFF position 12 is set at the reference position 16, the vehicular light switch 11 is returned to the AUTO position 13. More specifically, when the outside of the vehicle is so dark that the head light is necessary, it can be prevented that the vehicle runs in such a state that both the low beam 21 and the position light 22 are not turned on.

Further, as the examples in FIGS. 4 and 6 are described through comparing therebetween, according to the vehicular light switch 11 of the embodiment has advantageous effects with reference to the example in FIG. 6, which is a modification of the present embodiment, as follows;

Regarding the operation to switch the vehicular light switch 11 to the HEAD LIGHT position 15, the operation according to the present embodiment shown in FIG. 4 requires an operation load which is smaller than that of the modification shown in FIG. 6. The present embodiment shown in FIG. 4 requires the operation load indicated by the arrow a which is a small operation load. On the other hand, the modification shown in FIG. 6 requires the operation load indicated by the arrow b which is larger. Accordingly, the operation to switch the vehicular light switch 11 to the HEAD LIGHT position 15 in the example of the present embodiment shown in FIG. 4 has a higher operation ability. Further, in the arrangement of the momentary mechanism 36 having two steps at the SMALL position 14 and the OFF position 12 in one direction from the AUTO position 13, it is possible to have the click feeling at the positions by setting an operation load to the OFF position 12 higher than the operation load at the SMALL position 14, respectively.

However, in the modification in FIG. 6, as described, the directions of rotating the vehicular light switch 11 are opposite between the case where the light is turned off and the case where the light is turned on. Accordingly, this is instinctively easy to operate the switch, so that the modification (FIG. 6) has a higher operation ability.

The present invention is not limited by the present embodiment of the invention. For example, the above-described control by the second light control device may not be limited to the case where the driver switches the vehicular light switch 11 only to the SMALL position. In other words, also in the case where the vehicular light switch 11 is switched to the OFF position 12, the same control as the example described with reference to FIG. 3, may be done. More specifically when the outside of the vehicle is so dark that the head light is necessary while the vehicle is running, it is kept to turn on the low beam 21 and the position light 22 though the vehicular light switch 11 is switched to the OFF position 12.

Further, the above-described control by the first light control device 41 is not limited only to the case where the driver switches to the SMALL position 14 also. More specifically, also in a case where the vehicular light switch 11 is switched to the OFF position 12, it is possible to effect a control similar to the example described with reference to FIG. 2. More specifically, when the outside of the vehicle is so dark that the head light is necessary while the vehicle stops, in response to switch the vehicular light switch 11 to the OFF position 12, the low beam 21 and the position light 22 are turned off. Thereafter, when the vehicle runs, the low beam 21 and the position light are turned on again.

DESCRIPTION OF REFERENCE SYMBOLS 1 vehicular light system
11 vehicular light switch
12 OFF position
13 automatic (AUTO) position
14 small (SMALL) position
15 head light
21 low beam
22 position light
24 optical sensor
32 switching circuit
33 vehicle speed sensor
36 momentary mechanism (mechanism)
41 first light control device
42 second light control device
43 third light control device

The invention claimed is:

1. A vehicular light switch comprising:
a combination switch capable of switching a mode of a light for illuminating an outside by changing a position by rotation, wherein the light includes a head light and a position light, wherein positions of the combination switch include an automatic position and a SMALL position, wherein the automatic position is the position for performing a predetermined operation and the SMALL position is the position for turning on the position light;
a vehicle speed sensor configured to detect a speed of a vehicle;
an optical sensor configured to detect a brightness outside the vehicle; and
a mechanism configured to return the position of the combination switch to the automatic position when the position is rotated to the SMALL position,
wherein in a case where the position of the combination switch is returned by the mechanism to the automatic position after the position is changed to the SMALL position by rotation, when the speed of the vehicle detected by the vehicle speed sensor is lower than a predetermined speed, the head light is turned off and the position light is turned on, and when the speed of the vehicle detected by the vehicle speed sensor is equal to or higher than the predetermined speed, or when all of the switches provided to all brakes of the vehicle are turned off, the head light is turned on or off in accordance with the brightness outside the vehicle detected by the optical sensor as the predetermined operation.

2. The vehicular light switch according to claim 1, wherein the positions of the combination switch further include an OFF position, wherein the OFF position is the position for setting the mode for turning off all of a low beam and the position light; and
wherein the mechanism returns the position of the combination switch to the automatic position when the position is rotated to the OFF position.

3. The vehicular light switch according to claim 2, wherein the positions of the combination switch further include a head light position;
wherein the head light position is the position for setting the mode for turning on the low beam and the position light; and
wherein the position of the combination switch can be switched over by rotating the combination switch in a one direction from the automatic position, to the SMALL position, and then the OFF position and by rotating the combination switch in another direction from the automatic position to the head light position.

4. The vehicular light switch according to claim 2, wherein the positions of the combination switch further include a head light position;
wherein the head light position is the position for setting the mode for turning on the low beam and the position light;
wherein the position of the combination switch can be switched over by rotating the combination switch in a one direction from the automatic position to the OFF position and by rotating the combination switch in another direction from the automatic position, to the SMALL position, and then the head light position.

5. The vehicular light switch according to claim 3, wherein an operation load changing the position of the combination switch by rotation from the automatic position to the OFF position and an operation load changing the position of the combination switch by rotation from the automatic position to the SMALL position are different from each other.

6. The vehicular light switch according to claim 3, wherein an operation load changing the position of the combination switch by rotation from the automatic position to the OFF position is greater than the operation load changing the position of the combination switch by rotation from the automatic position to the SMALL position.

7. A vehicle light system comprising:
the vehicular light switch according to claim 1;

a low beam lighting circuit configured to control lighting of a low beam;

a position light lighting circuit configured to control lighting of the position light; and a first light control device, wherein when the brightness outside the vehicle detected by the optical sensor is lower than a predetermined value when the position is at the automatic position, the first light control device turns off the low beam and keeps turning on of the position light by the low beam lighting circuit, when the vehicle speed detected by the vehicle speed sensor is lower than the predetermined speed and there is an operation to shift the position of the combination switch to the SMALL position, and then, the first control device turns on the low beam when the vehicle speed detected by the vehicle speed sensor is equal to or higher than the predetermined speed.

8. A vehicular light system comprising:

the vehicular light switch according to claim 2; and a second light control device configured to keep turning on of the low beam and the position light when the optical sensor, configured to detect the brightness outside the vehicle, detects the brightness lower than a predetermined brightness, when the vehicle speed, detected by the vehicle speed sensor configured to detect the vehicle speed of the vehicle, is higher than the predetermined speed and when there is an operation of shifting the position to the SMALL position.

9. The vehicular light system according claim 7, further comprising: a switch sensor configured to detect ON and OFF information of at least one of switches including a foot brake, a side brake, a brake hold, and a parking range switch, wherein the first light control device turns off the low beam based on the vehicle speed detected by the vehicle speed sensor being lower than the predetermined speed and at least one of the switches being ON.

10. The vehicular light system according claim 9, wherein the first light control device turns on the low beam when in the switch sensor, all of the switches are OFF.

11. The vehicular light system according claim 8, further comprising: a switch sensor configured to detect ON and OFF information of at least one of switches including a foot brake, a side brake, a brake hold, and a parking range switch, wherein the second light control device turns on the low beam and the position light when the switch sensor detects that all of the switches of the foot brake, the side brake, the brake hold, and parking range switch are OFF.

12. The vehicular light system according claim 9, wherein the first light control device turns on the low beam when a failure is detected in the vehicle speed sensor or the switch sensor, and keeps turning on of the low beam by the low beam lighting circuit though the first light control device detects that the position is rotated to the OFF position or the SMALL position.

\* \* \* \* \*